United States Patent
Yang et al.

(10) Patent No.: US 9,451,078 B2
(45) Date of Patent: Sep. 20, 2016

(54) UNIVERSAL RECONFIGURABLE ECHO CANCELLATION SYSTEM

(71) Applicant: Creative Technology Ltd, Singapore (SG)

(72) Inventors: Jun Yang, San Jose, CA (US); Ian Minett, San Jose, CA (US); Robert Ridder, Santa Cruz, CA (US); Steven Verity, Santa Clara, CA (US)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 14/398,102

(22) PCT Filed: Apr. 30, 2013

(86) PCT No.: PCT/US2013/038958
§ 371 (c)(1),
(2) Date: Oct. 30, 2014

(87) PCT Pub. No.: WO2013/166080
PCT Pub. Date: Nov. 7, 2013

(65) Prior Publication Data
US 2015/0126255 A1    May 7, 2015

Related U.S. Application Data

(60) Provisional application No. 61/640,681, filed on Apr. 30, 2012.

(51) Int. Cl.
*H04M 1/38* (2006.01)
*H04M 3/00* (2006.01)
*G10L 21/0208* (2013.01)
*H04B 3/20* (2006.01)
*H04M 9/08* (2006.01)
*H04B 3/23* (2006.01)

(52) U.S. Cl.
CPC .......... *H04M 3/002* (2013.01); *G10L 21/0208* (2013.01); *H04B 3/20* (2013.01); *H04M 9/082* (2013.01); *G10L 2021/02082* (2013.01); *H04B 3/23* (2013.01)

(58) Field of Classification Search
CPC ...... H04M 9/082; H04M 3/002; H04B 3/23; H04B 3/234; H04B 3/20; H04B 3/237
USPC ....... 455/570, 550, 403, 422.1, 67.11, 569.1, 455/426.1, 426.2; 370/289, 290; 379/406.08
See application file for complete search history.

(56) References Cited

U.S. PATENT DOCUMENTS

| | | | |
|---|---|---|---|
| 5,315,585 A * | 5/1994 | Iizuka | H04B 3/23 370/289 |
| 7,672,445 B1 | 3/2010 | Zhang et al. | |
| 2010/0104091 A1* | 4/2010 | Yue | H04B 3/23 379/406.08 |

*Primary Examiner* — Keith Ferguson
(74) *Attorney, Agent, or Firm* — Russell Swerdon; Desmund Gean

(57) ABSTRACT

A universal reconfigurable system and method are provided for reducing nonlinear echo and residual echo, and for echo leakage prevention in various time-varying and complex environments is proposed in this invention. According to one embodiment an echo cancellation system includes (1) an adaptive linear filter implemented in either time-domain or frequency-domain; (2) a nonlinear echo suppression; (3) echo leakage prevention; (4) direct current (DC), low frequency residual echo and noise reduction; (5) time-domain nonlinear processor (NLP) to reduce the residual echo; and (6) frequency-domain NLP to further reduce the residual echo. The echo cancellation system is universally applicable to acoustic echo cancellation (AEC) and/or electrical echo cancellation applications. In terms of AEC, this invention is reconfigurable for one or more microphones and/or one or more reference channels. The numbers of microphones and reference channels are user configurable.

20 Claims, 9 Drawing Sheets

UNIVERSAL RECONFIGURABLE ECHO CANCELLATION SYSTEM

BACKGROUND OF THE INVENTION

1. Field of the Invention

The present invention relates to processing signals. More particularly, the present invention relates to a system and method for processing signals to reduce echo or noise.

2. Description of the Related Art

With the rapid development and converged uses of various customer electronic devices, hands-free communication systems, speakerphones, laptops with internal or external speakers, and videoconference systems involving the use of loudspeakers and microphones, a user is able to talk more naturally without using a handset. This type of use makes application environments more complex and harder to deal with. Moreover, this emerging application leads to new additional problems, e.g., the situation that the user's own voice can be heard over at the remote site with a delay but can not be noticed at the local site. In addition, electrical echoes may occur from signal reflections in hybrid circuits that convert between 4-wire and 2-wire circuits. All the above suggests a need for the superposition of echo presented together with the target speech signal by different ways from existing echo cancellation systems.

Accordingly, goals of this invention include addressing the above problems by providing an effective and robust echo cancellation system and its real-time implementation.

SUMMARY OF THE INVENTION

For various, time-varying and complex environments, this invention proposes an effective, simple and robust echo cancellation (EC) scheme with good audio quality and double talk performance. More importantly, the proposed scheme can automatically reconfigure in real-time the system settings, processing structures and parameters to deal with any practical application environment while continually maintaining good performance.

According to one aspect of the invention, a system for processing signals includes an echo cancellation processing module, a nonlinear echo processing module, and an echo leakage prevention module. The echo cancellation linear processing module is operable to generate a first output signal by adaptively filtering an input signal. The first output signal is the input signal with any linear echo reduced. The nonlinear echo processing module is operable to generate a second output signal based on the first output signal. The second output signal is the first output signal with any residual linear echo or nonlinear echo reduced. The echo leakage prevention module is operable to generate a third output signal based on the second output signal. The third output signal is the second output signal with echo leakage reduced.

According to various embodiments, the system may include a first residual echo suppression module operable to generate a fourth output signal based on the third output signal with any additional residual echo reduced. The system may also include a second residual echo suppression module operable to generate a fifth output signal based on the fourth output signal with any additional residual echo reduced. In this case, the first residual echo suppression module is based in the time-domain and the second residual echo suppression module is based in the frequency-domain. Yet, the system may include a HPF operable to reduce low frequency residual echo or noise. The HPF is typically positioned inline with the input signal.

According to another aspect of the invention, a method for an echo cancellation system to process signals is provided. The method includes: 1) generating a first output signal by adaptively filtering an input signal such that the first output signal is the input signal with any linear echo reduced; 2) generating a second output signal based on the first output signal such that the second output signal is the first output signal with any residual linear echo or nonlinear echo reduced; and 3) generating a third output signal based on the second output signal such that the third output signal is the second output signal with echo leakage reduced.

With the proposed adaptive nonlinear echo suppression, the nonlinear echo caused by the nonlinearity, instable adaptive filter, and so on, can be effectively reduced. With the proposed nonlinear processors (NLPs), the residual echo can be greatly reduced so as to avoid the howling effect which is highly undesired. With the proposed echo leakage prevention, the system output will not result in echo caused by the linear EC unit when the microphone is taken off or muted in the acoustic echo cancellation (AEC) system.

The designs of each unit are independent of the levels of the input audio signal and the EC reference signal. The proposed scheme can provide the users with good audio quality, good full-duplex performance, and an effective solution for any acoustic EC and electrical EC applications.

The invention extends to a machine readable medium embodying a sequence of instructions that, when executed by a machine, cause the machine to carry out any of the methods described herein.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals and references refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

1. Introduction

Hands-free communication systems, speakerphones, laptops with internal or external speakers, and videoconference setting-ups involve the use of loudspeakers and microphones. They allow users to talk more naturally without using a handset. This new type of use leads to new problems, namely the superposition of acoustical echo presented together with the target speech signal. It results in the other site hearing his/her own voice with a delay, but will not be noticed at the local site.

Electrical echo may also be caused by signal reflection in a hybrid circuit that converts between 4-wire and 2-wire circuits. Users in this situation will also hear their own voice with a delay which is very annoying.

Figure 1:
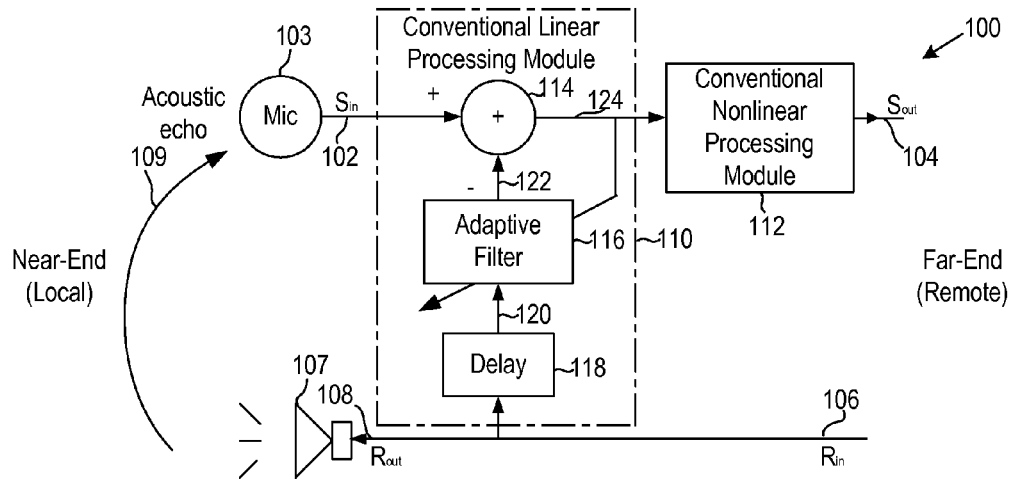
FIG. 1 is a schematic block diagram illustrating a conventional system for acoustic echo cancellation.

FIG. 1 is a schematic block diagram illustrating a conventional system for acoustic echo cancellation. Conventional system 100 includes a linear processing module 110 and a nonlinear processing module 112 as shown in FIG. 1. A Delay 118 typically compensates for the pure delay resulting from a digital to analog (D/A) converter (not shown), the distance between the microphone 103 and the loudspeaker 107, buffering scheme, and an analog to digital (A/D) converter (not shown). An adaptive linear filter 116 attempts to model the transfer function between the loudspeaker signal 108 and the microphone signal 102. This transfer function accounts for the two transducers (e.g., microphone 103, loudspeaker 107), the A/D and D/A converters, and the acoustic echo path 109. The adaptive linear filter 116 constantly monitors the transfer function and tracks changes in the acoustic echo path 109 with commonly employed least mean-squared (LMS) based algorithms. The adaptive linear filter 116 can be implemented in either time domain (TD) or frequency-domain (FD). Some of these techniques are disclosed in [1] Toon van Walterschoot, Geert Rombouts, Piet Verhoeve and Marc Moonen, "Double-Talk-Robust Prediction Error Identification Algorithms for Acoustic Echo Cancellation," IEEE Transactions on Signal Processing, Vol. 55, No. 3, pp. 846-858, March 2007; and [2] Paul L. Feintuch, "Normalized Frequency Domain LMS Adaptive Filter," U.S. Pat. No. 5,4,939,685, issued on Jan. 3, 1990; the entire contents of which are incorporated by reference.

The output 122 of the adaptive linear filter 116 is very close to the echo portion of the microphone signal 102. Subtracting the adaptive linear filter output 122 from the microphone signal 102 reduces the echo. Since there is always a residual echo after the linear adaptive subtraction due to the fact that the adaptive linear filter 116 can neither be 100% accurate nor exactly model the transfer function, the nonlinear processing module 112 implements a nonlinear processor (NLP) technique that is necessary to further reduce the residual echo.

However, traditional NLPs (e.g., center clipper as disclosed in [3] Campanella; Samuel Joseph, et al., "Echo suppressor using frequency-selective center clipping", U.S. Pat. No. 4,031,338, issued on Jun. 21, 1977; [4] Lassaux; Jean, et al., "Echo canceller and center clipper control arrangement", U.S. Pat. No. 4,679,230, issued on Jul. 7, 1987; or [5]. Rasmusson; Jim A. J., "Echo-canceling system and method using echo estimate to modify error signal", U.S. Pat. No. 5,475,731, issued on Dec. 12, 1995; the content of which are incorporated by reference, noise-gate or spectral subtraction approaches) will distort the near-end voice. Also, it would not get rid of the residual echo very well due to the following factors: (1) user movement, position changes in the microphone(s) and loudspeaker(s), and loudspeaker volume changes resulting in a time-varying echo, especially when the echo path changes faster than the convergence rate of the adaptive filter; and (2) when the near-end talker is speaking, the adaptive filter will tend to erroneously "adjust" itself to what it perceives to be a change in the acoustic echo path 109.

In addition, the adaptive linear filter 116 would not be able to remove the nonlinear echo caused by any instability of the adaptive filter and non-linearity in the AEC system 100 circuitry, such as from the loudspeaker 107, A/D converter, D/A converter due to an overdriven speaker, microphone saturation, mechanical vibration, and so on. Moreover, when the microphone 103 is muted or taken away while a far-end user is still speaking, the linear adaptive filter 116 would not have exactly zero values for all the filter weights, which will result in the echo at the output and is a kind of echo leakage problem. Similarly, this condition occurs in the electrical EC system for the case of no electrical echo.

Obviously, techniques that suppress the nonlinear echo and residual echo together with prevent the echo leakage are highly desirable. It is a goal of this invention to address the above problems by providing an effective and robust echo cancellation system with improved echo cancellation performance and enhanced full-duplex communication.

2. The Proposed Echo Cancellation System

According to various embodiment of the present invention, a universal reconfigurable scheme and system are provided for reducing nonlinear echo and residual echo, and for echo leakage prevention in various time-varying and complex environments. According to one embodiment, an echo cancellation system includes (1) an adaptive linear filter implemented in either time-domain or frequency-domain; (2) a nonlinear echo suppression; (3) echo leakage prevention; (4) direct current (DC), low frequency residual echo and noise reduction; (5) time-domain nonlinear processor (NLP) to reduce the residual echo; and (6) frequency-domain NLP to further reduce the residual echo. The echo cancellation system is universally applicable to acoustic echo cancellation (AEC) and/or electrical echo cancellation applications. In terms of AEC, this invention is reconfigurable for one or more microphones and/or one or more reference channels. The numbers of microphones and reference channels are user configurable.

Figure 2:
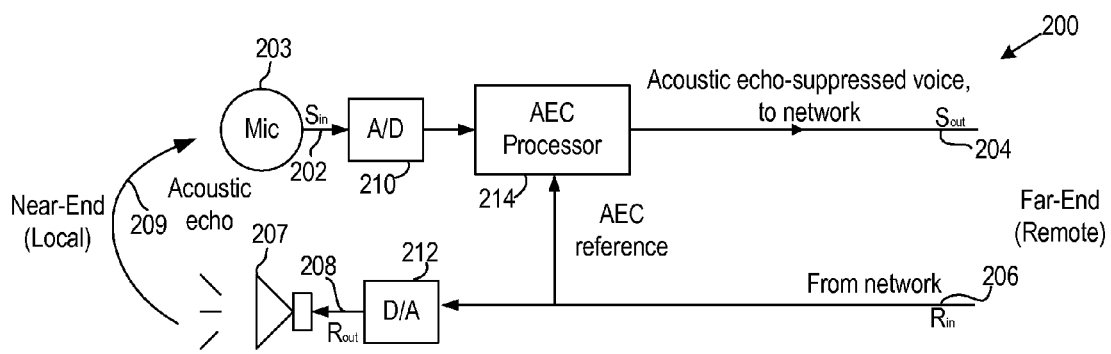
FIG. 2 is a schematic block diagram illustrating a system for acoustic echo cancellation according to various embodiments of the present invention.

FIG. 2 is a schematic block diagram illustrating a system 200 for acoustic echo cancellation according to various embodiments of the present invention. FIG. 2 shows an application setting of AEC system 200. System 200 includes components such as a converter 212, loudspeaker 207, microphone 203, converter 210, AEC processor 214, and wired or wireless network/circuitry interconnecting the various system components. Converter 212 is configured for receiving a signal 206 from a network coupled to a far-end (remote) site, converting signal 206 with converter 212 (e.g., D/A converter), and outputting a converted signal 208 of signal 206 to loudspeaker 207 for reproduction at a near-end (local) site. In a preferred embodiment, the reproduced converted signal 208 includes an acoustic echo along acoustic echo path 209. Microphone 203 is configured for receiving the acoustic echo along acoustic echo path 209 and outputting it as a microphone signal 202 to converter 210. Converter 210 is configured for receiving microphone signal 202, converting microphone signal 202 with converter 210 (e.g., A/D converter), and outputting a converted signal of microphone signal 202 to AEC processor 214. AEC processor 214 may include any portion of conventional linear processing module 110, conventional nonlinear processing module 112, and any other improvements discussed herein (e.g., See FIGS. 4 and 5 for further details). In general, AEC processor 214 is configured for generating and outputting an acoustic echo-suppressed voice signal 204 to the network coupled to the far-end (remote) site. Acoustic echo-suppressed voice signal 204 is generated based on the converted microphone signal 202 of the acoustic echo along acoustic echo path 209 and an AEC reference signal (e.g., signal 206).

Figure 3:
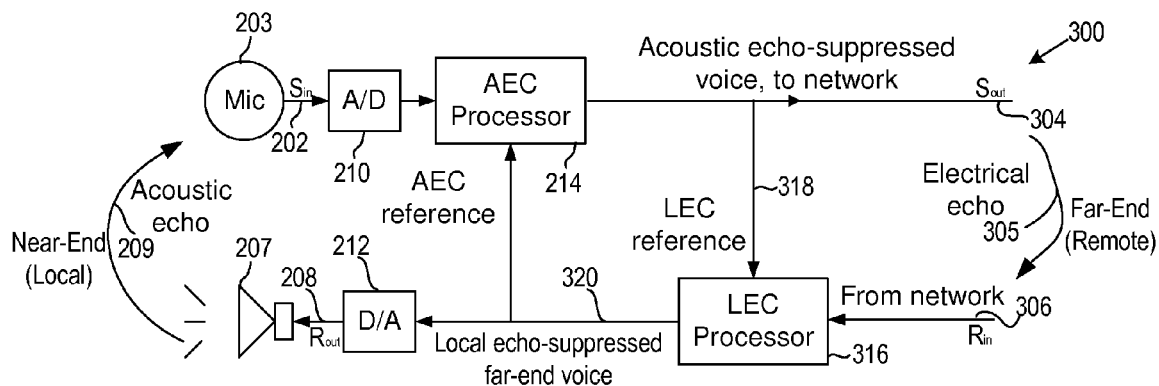
FIG. 3 is a schematic block diagram illustrating a system for acoustic and electrical echo cancellations according to various embodiments of the present invention.

FIG. 3 is a schematic block diagram illustrating a system 300 for acoustic and electrical echo cancellations according to various embodiments of the present invention. FIG. 3 shows the application setting of acoustic and electrical echo cancellations system 300. System 300 includes similar components as System 200 such as a converter 212, loudspeaker 207, microphone 203, converter 210, AEC processor 214, and wired or wireless network/circuitry interconnecting the various system components. System 300 also includes a local/line/electrical echo cancellation (LEC) processor 316. Similar to AEC processor 214, LEC processor 316 may include any portion of conventional linear processing module 110, conventional nonlinear processing module 112, and any other improvements discussed herein (e.g., See FIGS. 4 and 5 for further details). In general, LEC processor 316 is configured for generating and outputting a local echo-suppressed far-end voice signal 320 to converter 212 and as the AEC reference to AEC processor 214. Local echo-suppressed far-end voice signal 320 is generated based on a signal 306 representative of the electrical echo along electrical echo path 305 and a LEC reference signal 318. LEC reference signal 318 is an acoustic echo-suppressed voice signal 304 generated from AEC Processor 214 to the network coupled to the far-end (remote) site. In a preferred embodiment, the proposed "nonlinear echo suppression" component applies for AEC while the rest of the components apply for both AEC and LEC. Therefore, the present invention relates more specifically to the techniques for AEC.

Figure 4:
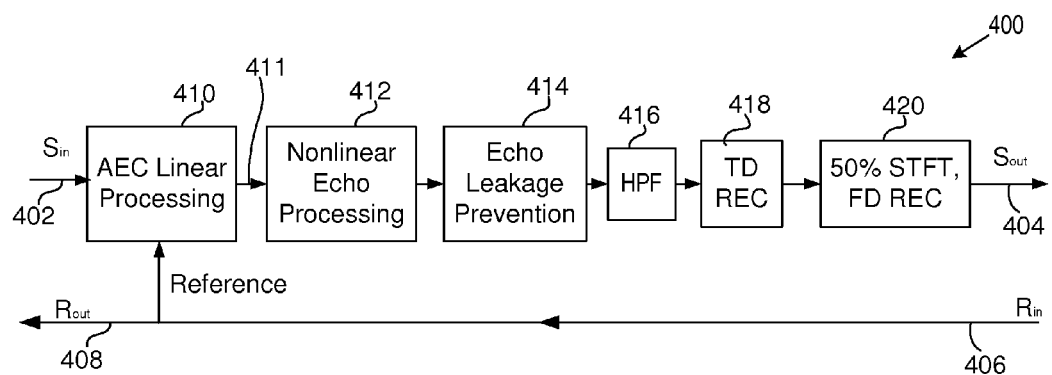
FIG. 4 is a schematic block diagram illustrating a system for acoustic echo cancellation according to various embodiments of the present invention.

FIG. 4 is a schematic block diagram illustrating a system 400 for acoustic echo cancellation according to various embodiments of the present invention. The proposed system 400 mainly includes six processing units: (1) AEC Linear Processing 410, i.e., an adaptive linear filter (See Sec. 2.1 and FIGS. 6, 7, and 8 for further details); (2) nonlinear echo suppression 412 (See Sec. 2.2 and FIG. 9 for further details); (3) echo leakage prevention 414 (See Sec. 2.3 and FIG. 10 for further details); (4) high pass filter (HPF) 416, i.e., low frequency residual echo and noise reduction (See Sec. 2.4 and FIGS. 11 and 12 for further details); (5) TD REC 418, i.e., time-domain residual echo suppression (See Sec. 2.5 and FIG. 13 for further details); and (6) FD REC 420, i.e., frequency-domain residual echo suppression (See Sec. 2.6 for further details). However, it will be appreciated by those skilled in the art that any combination of the six processing units may be used depending on the specific application. That is, any of the six processing units may be included, omitted, or reordered depending on the application.

Sin 402 and Rin 406 are the inputs to the AEC system 400 whereas Sout 404 and Rout 408 are the outputs of the AEC system 400. In a two-way voice communication system, the send path is from Sin 402 to Sout 404 and the receive path is from Rin 406 to Rout 408. Sin 402 is the microphone signal (e.g., 202) which includes near-end (NE) voice, NE environment noise, and acoustic echo. Rin 406 (e.g., 206, 306) is the far-end (FE) voice, i.e., input of the receive path. Sout 404 (e.g., 204, 304) is the echo-suppressed signal sent to the network for FE people to listen to. Rout 408 (e.g., 208) goes to the NE loudspeaker (e.g., 207) for NE people to listen to. In a preferred embodiment, FD REC 420 is configured for "50% STFT", which means short-time Fourier transform (STFT) with input 50% overlap.

Figure 5:
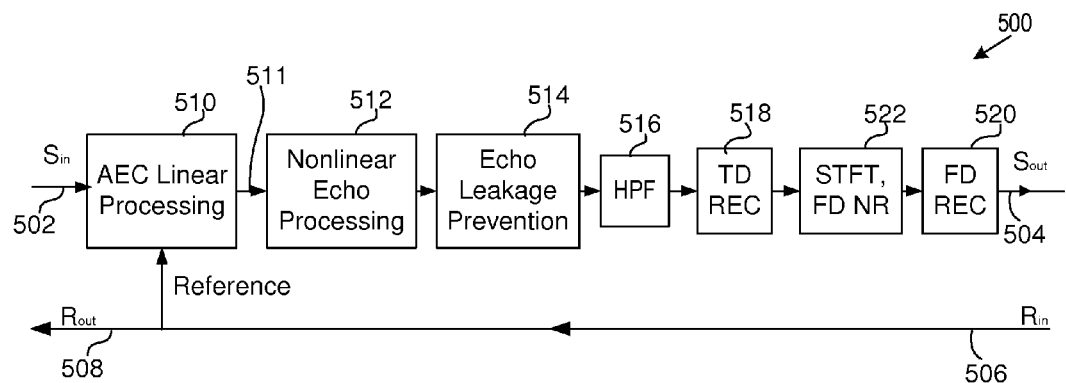
FIG. 5 is a schematic block diagram illustrating a system for acoustic echo cancellation with integrated noise reduction according to various embodiments of the present invention.

FIG. 5 is a schematic block diagram illustrating a system 500 for acoustic echo cancellation with integrated noise reduction according to various embodiments of the present invention. System 500 includes similar elements as those in system 400. For example, elements 502, 504, 506, 508, 510, 511, 512, 514, 516, 518, 520 are similar to elements 402, 404, 406, 408, 410, 411, 412, 414, 416, 418, 420. However, this proposed AEC system 500 has been integrated with a noise reduction (NR) technology such as FD NR 522, which is a frequency-domain NR. Many FD NR technologies are available, which is beyond the scope of this invention. System 400 or 500 can be incorporated into either system 200 or 300, especially in AEC Processor 214 and/or LEC 316 Processor, and modified accordingly to their specific application. It will be appreciated by those skilled in the art that any combination of the seven processing units in system 500 may be used depending on the specific application.

2.1 AEC Linear Processing

Figure 6:
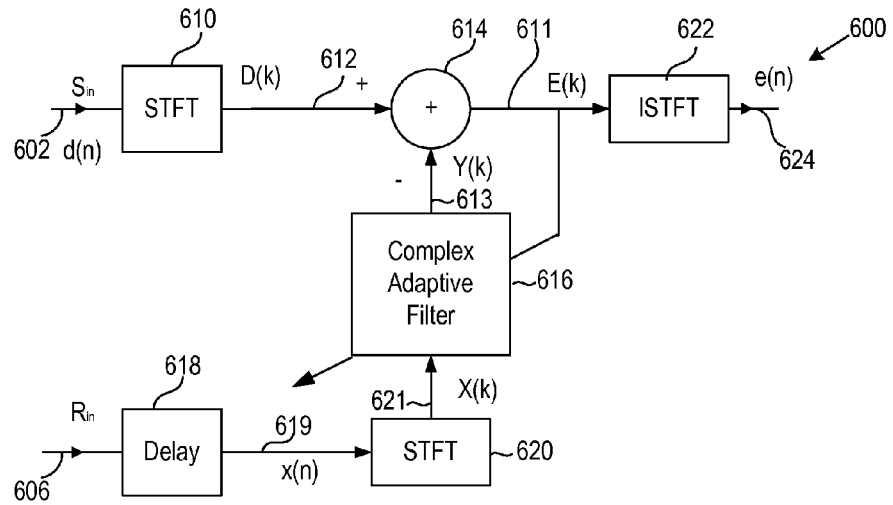
FIG. 6 is a schematic block diagram illustrating a system/module for frequency-domain adaptive linear filtering according to various embodiments of the present invention.

AEC Linear Processing (e.g., 410, 510) includes an adaptive linear filter that can be implemented in either time-domain or frequency-domain. FIG. 6 is a schematic block diagram illustrating a system/module 600 for frequency-domain adaptive linear filtering according to various embodiments of the present invention. An example of the FD least mean-squared (LMS) based algorithms is shown as in FIG. 6. In FIG. 6, STFT 610 and ISTFT 622 denote short-time Fourier transform and inverse STFT, respectively. Delay 618 compensates for any pure delay resulting from one or more of the following factors: a D/A converter (e.g., 212), the distance between the microphone (e.g., 203) and the loudspeaker (e.g., 207), buffering scheme, and an A/D converter (e.g., 210). The frequency domain (FD) filtering, i.e., Complex Adaptive Filter 616, is implemented by a complex multiply. The index n and k are for sample index and the frame index, respectively. The output of the FD filtering, Y(k) 613, is the estimated echo.

STFT 610 receives input signal Sin 602 and generates output signal 612. Sin 602 is shown as a time-domain d(n) and output signal 612 as frequency-domain D(k). Sin 602 may correspond to a microphone signal (e.g., Sin 202, 402, 502) and be formatted by a converter (e.g., 210) into a useable format. STFT 620 receives input signal 619 as a time-domain x(n) reference data and generates output signal 621 as a frequency-domain X(k) reference data. Input signal x(n) 619 is generated by Delay 618 based on input Rin 606, which may correspond to a AEC/LEC reference signal (e.g., 406, 506, 206, 318, 320). Complex Adaptive Filter 616 generates Y(k) estimated echo signal 613 based on X(k) reference data signal 621 and E(k) residual echo signal 611, which is determined by comparing D(k) microphone signal 612 and Y(k) estimated echo signal 613 with operator 614 (e.g., adder, subtractor, etc.). E(k) residual echo signal 611 is then processed by ISTFT 622 to generate output signal 624 as a time-domain e(n) residual echo signal. Time-domain e(n) residual echo signal may correspond to output signals 411 and 511 in FIGS. 4 and 5 respectively.

Figure 7:
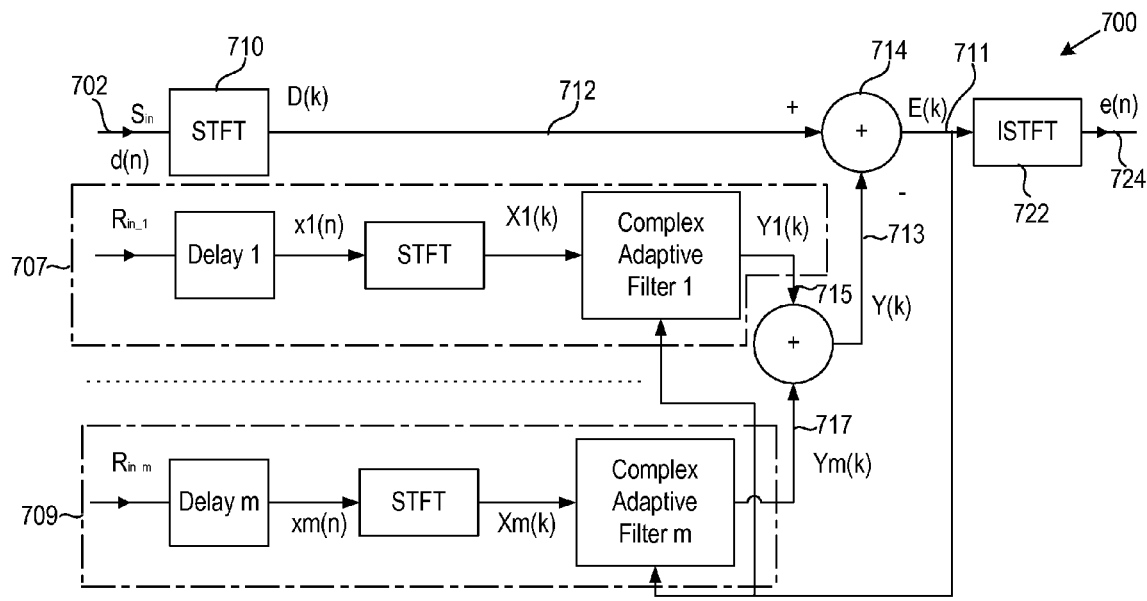
FIG. 7 is a schematic block diagram illustrating a system/module for acoustic echo cancellation with two or more reference channels according to various embodiments of the present invention.

If there are two or more loudspeakers, the estimated echo of each reference channels should be summed before the subtraction operation by operator 614. FIG. 7 is a schematic block diagram illustrating a system/module 700 for acoustic echo cancellation with two or more reference channels according to various embodiments of the present invention. FIG. 7 shows the AEC system with the m reference channels. According to a preferred embodiment, Y(k) estimated echo signal 713 is based on adding together estimated echo signals for m reference channels. For example, Y(k) estimated echo signal 713 is the result of adding Y1(k) estimated echo signal 715 and Ym(k) estimated echo signal 717 based on process modules 707 and 709 respectively. The elements in process modules 707 and 709 are similar to corresponding elements in FIG. 6 (e.g., 606, 618, 619, 620, 621, 616, 613). Further, elements 702, 710, 712, 714, 711, 722, and 724 are similar to corresponding elements 602, 610, 612, 614, 611, 622, and 624.

Figure 8:
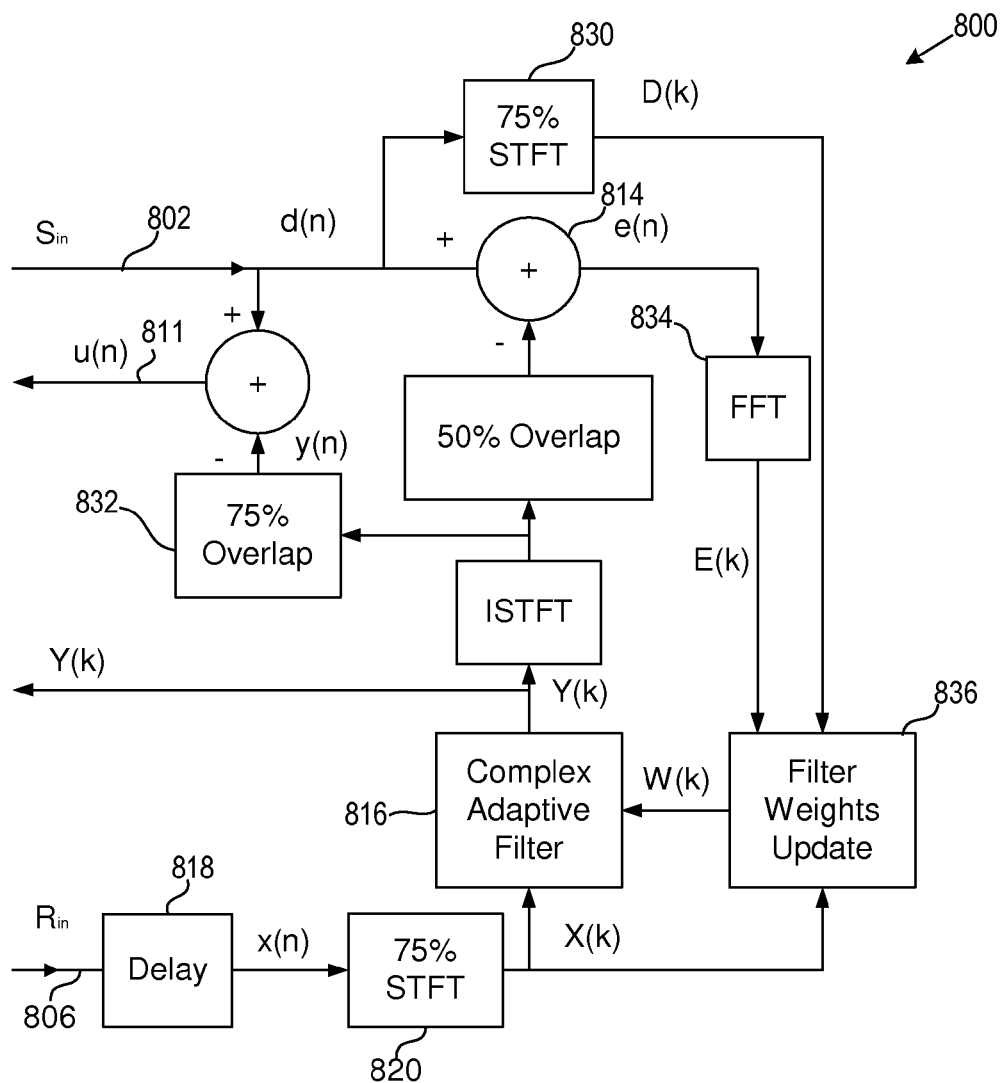
FIG. 8 is a schematic block diagram illustrating a system/module for frequency-domain adaptive linear filtering according to various embodiments of the present invention.

Another example of the FD least mean-squared (LMS) based algorithms is shown as in FIG. 8. FIG. 8 is a schematic block diagram illustrating a system/module 800 for frequency-domain adaptive linear filtering according to various embodiments of the present invention. In FIG. 8, the block of "75% STFT" 830 means STFT with input 75% overlap, the block of "75% Overlap" 832 means that the output has 75% overlap, the FFT 834 is the Fast Fourier transform. The u(n) 811 is the time-domain echo-reduced output. In a preferred embodiment, u(n) 811 corresponds to output signals 411 and 511 in FIGS. 4 and 5 respectively The block of Filter Weights Update 836 is based on the FD normalized LMS, which is described in detail as follows:

The set of filter weights W(k) are updated according to $$W(k+1) = W(k) + 2\frac{\mu}{P(K)}X^*(k)E(k), \quad (1)$$

where k is the frame index, $X^*(k)$ is the conjugate of FD reference data X(k), $\mu$ is the adaptation step size, and P(k) is the smoothed reference power given by $$P(k+1) = \beta P(k) + (1.0-\beta)(X^*(k)X(k))^{0.75} \quad (2)$$

where $0.0 < \beta < 1.0$. Note that both Eq. 1 and Eq. 2 are written in vector notation, so the equation is true for each frequency bin.

In addition, the adaptation step size $\mu$ is automatically adjusted by the coherence between D(k) and X(k). The higher is the coherence, the larger the adaptation step size $\mu$ is. When the coherence gets low enough, the adaptation is frozen. As such, the proposed scheme can automatically reconfigure in real-time the system settings, processing structures and parameters to deal with any practical application environment while continually maintaining good performance. The calculation of the coherence is as follows:

$$C(k) = E[D_n(k)X^*_n(k)]/(\sqrt{E[D_n(k)D^*_n(k)]}\sqrt{E[X_n(k)X^*_n(k)]}) \quad (3)$$

where $E[\bullet]$ is the statistical expectation operator, k is the frame index, n is the frequency index.

For the AEC system with the m reference channels. each reference channel has its own Complex Adaptive Filter processing. The Y(k) in FIG. 8 will be the summation of the outputs of all the Complex Adaptive Filters.

For the AEC system with the N microphones, the above calculation will be repeated for N times. Therefore, for the AEC system with m reference channels and N microphones, there will be (m×N) adaptive processing.

2.2 Nonlinear Echo Processing

Figure 9:
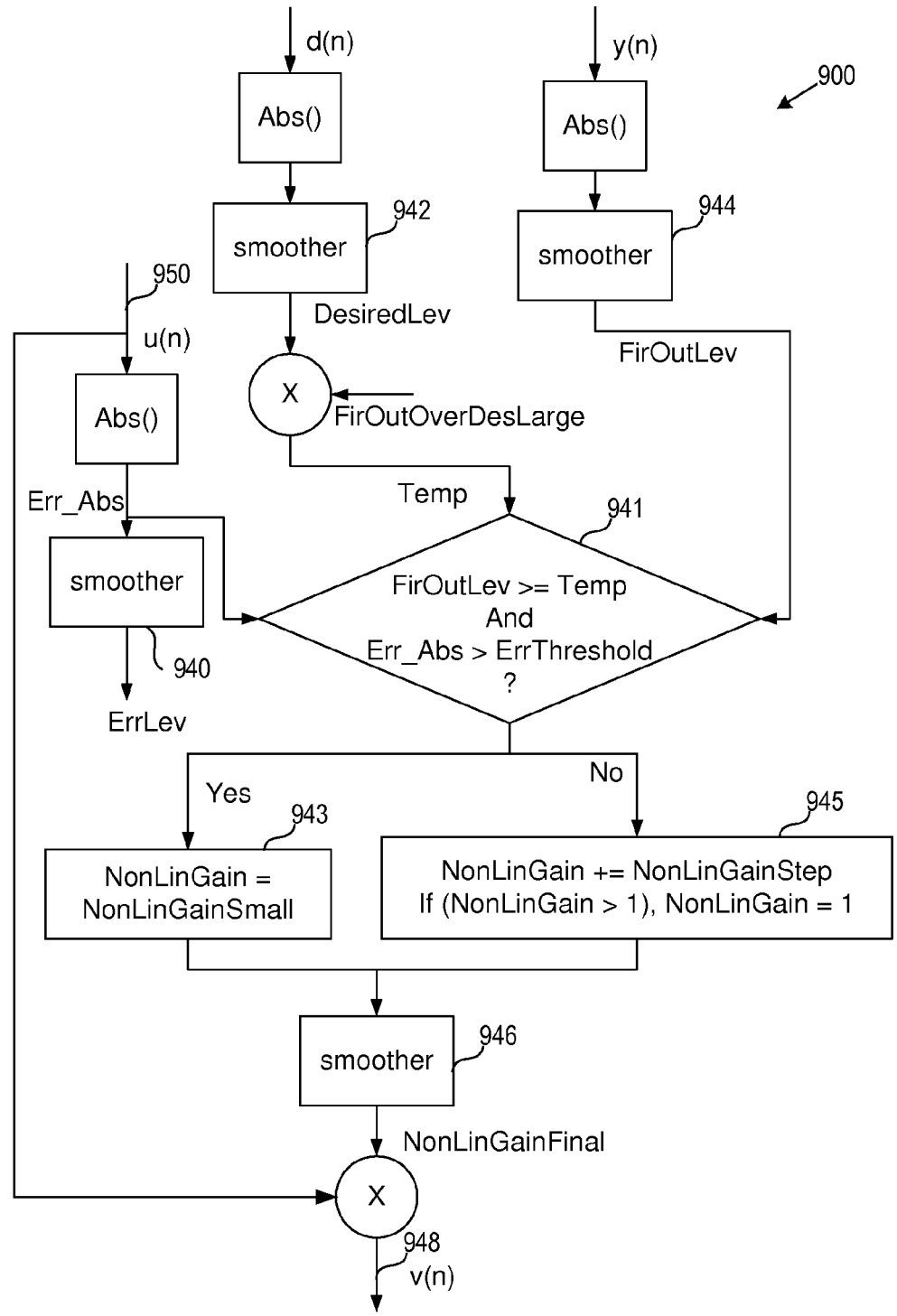
FIG. 9 is a flow diagram for nonlinear echo processing according to various embodiments of the present invention.

FIG. 9 is a flow diagram 900 for nonlinear echo processing according to various embodiments of the present invention. For example, the process flow of Nonlinear Echo Processing 412, 512 in FIG. 4 or 5 is illustrated as shown in FIG. 9. The smoother in FIG. 9 is implemented as follows:

$$\text{Output}(n+1) = \text{Input}(n) + (\text{Output}(n) - \text{Input}(n))^*\alpha \quad (4)$$

where $0.0 < \alpha < 1.0$; $\alpha = 0.995$ for the three smoothers of ErrLev 940, DesiredLev 942, and FirOutLev 944; and $\alpha = 0.9375$ for the smoother of NonLinGainFinal 946. Furthermore, the constants FirOutOverDesLarge, ErrThreshold, NonLinGainSmall, and NonLinGainStep are 0.99, 0.02, 0.40, and 0.002, respectively.

In FIG. 9, an Abs( ) block processes the energy level of its input signal, which is the absolute value of the corresponding input signal (e.g., u(n) 950, microphone signal d(n), estimated echo signal y(n)) A determination 941 is made as to whether non-linear echo is present. The determination is based on the estimated echo signal (e.g., FirOutLev), microphone signal (e.g., DesiredLev, Temp), and echo-reduced signal u(n) 950 (e.g., Err_Abs). A gain (e.g., 943, 945) is then assigned based on the determination 941. The nonlinear echo reduced output v(n) 948 is then generated, which is based on applying the appropriate gain 943, 945 after smoother 946 to the echo-reduced signal u(n) 950. In a preferred embodiment, v(n) 948 corresponds to output signals of 412 and 512 in FIGS. 4 and 5 respectively whereas u(n) 950 corresponds to output signals 411 and 511 in FIGS. 4 and 5 respectively. It should be appreciated by those skilled in the art that the constant values and processes noted are for exemplary purposes only and that other values and processes may be substituted for achieving nonlinear echo suppression.

2.3 Echo Leakage Prevention

Figure 10:
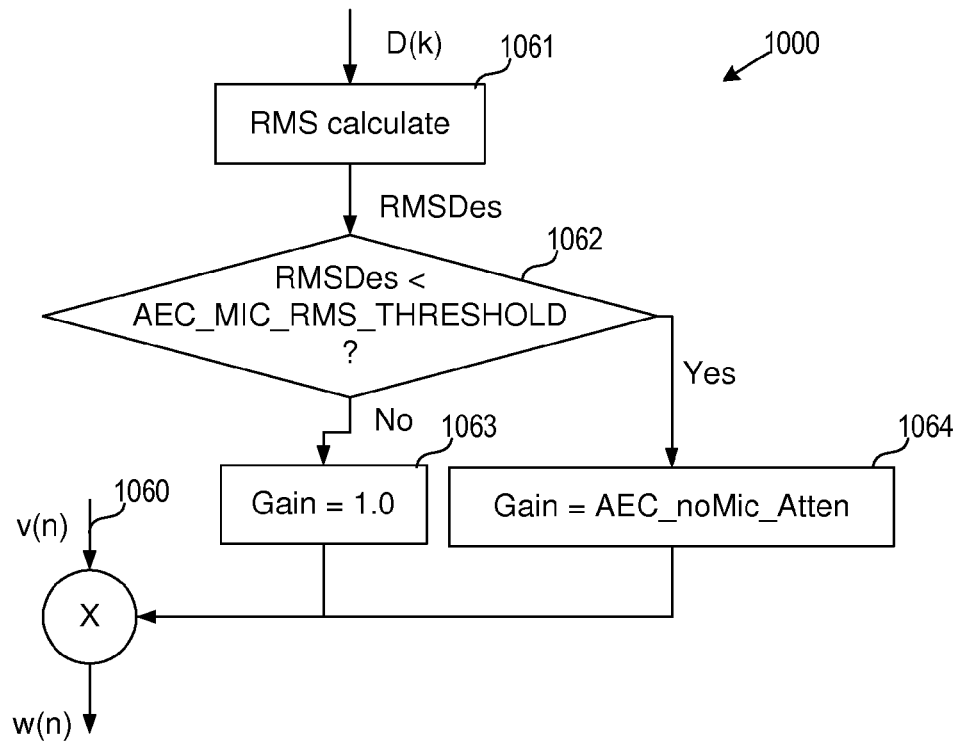
FIG. 10 is a flow diagram for echo leakage prevention according to various embodiments of the present invention.

FIG. 10 is a flow diagram 1000 for echo leakage prevention according to various embodiments of the present invention. For example, the process flow of Echo Leakage Prevention 414, 514 in FIG. 4 or 5 is illustrated as shown in FIG. 10. The root-mean-square (RMS) value of the microphone signal (e.g., D(k)) in the frequency range of 600 Hz to 2500 Hz is calculated 1061. A determination module 1062 is configured for determining whether the RMS value (e.g., RMSDes) of the microphone signal is less than a minimum input threshold (e.g., AEC_MIC_RMS_THRESHOLD). A gain module 1063, 1064 is configured for assigning a gain (e.g., 1, AEC_noMic_Atten) for reducing echo leakage based on whether the RMS value of the microphone signal is less than the minimum input threshold. When the microphone is muted or is taken off, the RMSDes is very small. Therefore, by applying a reduction gain to the voice signal v(n) 1060 (e.g., 411, 511, 948) in this situation, the board noise floor could be suppressed in generating an echo leakage prevention output signal w(n) (e.g., output of Echo Leakage Prevention 414, 514). In a preferred embodiment, the AEC_MIC_RMS_THRESHOLD and AEC_noMic_Atten are 0.0005 and 0.25, respectively. It should be appreciated by those skilled in the art that the constant values and processes noted are for exemplary purposes only and that other values and processes may be substituted for achieving echo leakage prevention.

2.4 HPF

Figure 11:
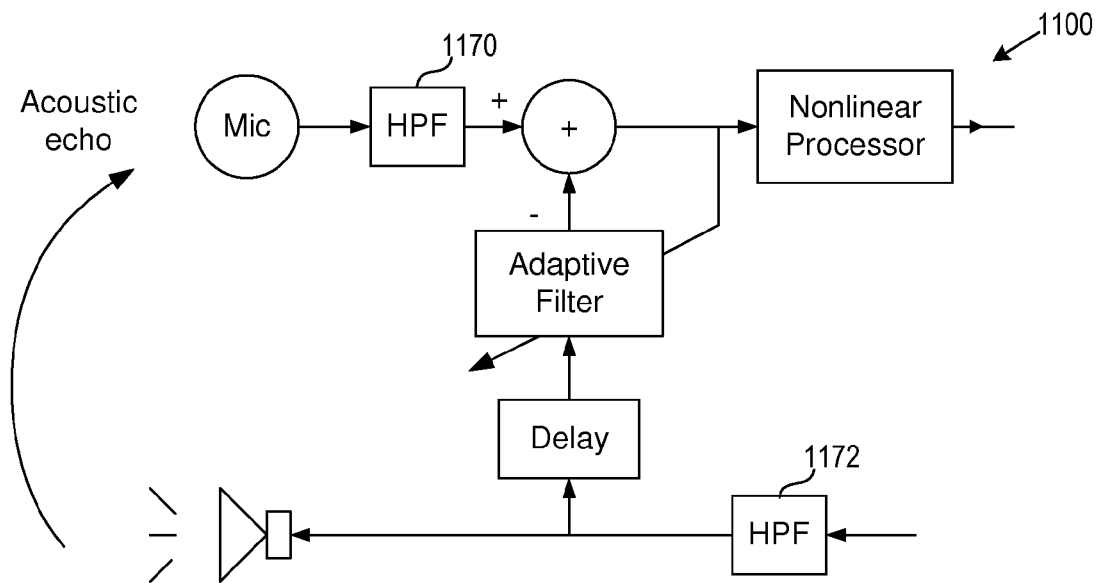
FIG. 11 is a schematic block diagram illustrating a system for acoustic echo cancellation with integrated HPFs according to various embodiments of the present invention.

FIG. 11 is a schematic block diagram illustrating a system 1100 for acoustic echo cancellation with integrated HPFs 1170, 1172 according to various embodiments of the present invention. Traditionally, a HPF is applied for both the microphone signal and the reference signal as shown in FIG. 11; therefore, for the proposed AEC system with N microphones and m loudspeakers, there are (N+m) HPFs. According to a preferred embodiment of the present invention, only N HPFs are needed so that the MIPS and memory are reduced. HPFs can be integrated into systems 400 and 500 accordingly.

Figure 12:
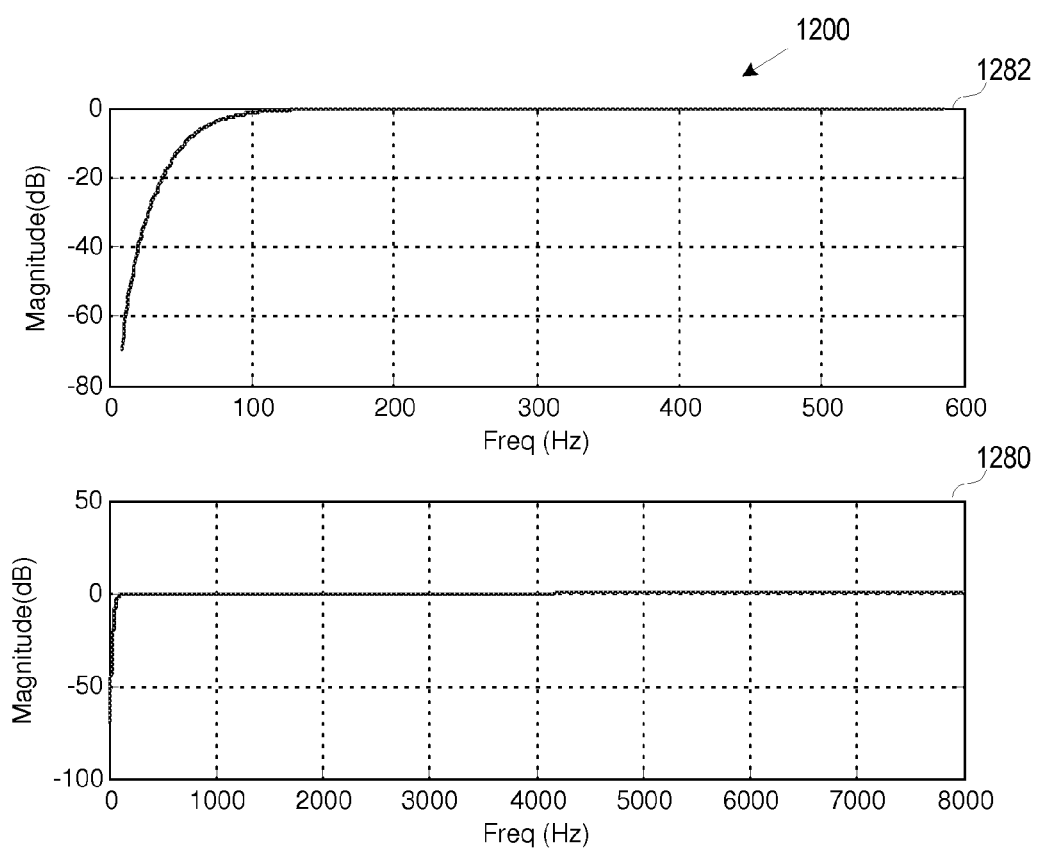
FIG. 12 is a diagram illustrating a frequency response of an HPF according to various embodiments of the present invention.

FIG. 12 is a diagram 1200 illustrating a frequency response of an HPF according to various embodiments of the present invention. Specifically, FIG. 12 is the frequency response of the designed HPF according to a preferred embodiment of the present invention. The lower portion 1280 of diagram 1200 is the frequency response of the designed HPF for 0-8000 Hz. The upper portion 1282 of diagram 1200 is an enlargement of the lower portion 1280 of diagram 1200 for the frequency response between 0-600 Hz.

2.5 TD REC (Time-Domain Residual Echo Suppression)

Figure 13:
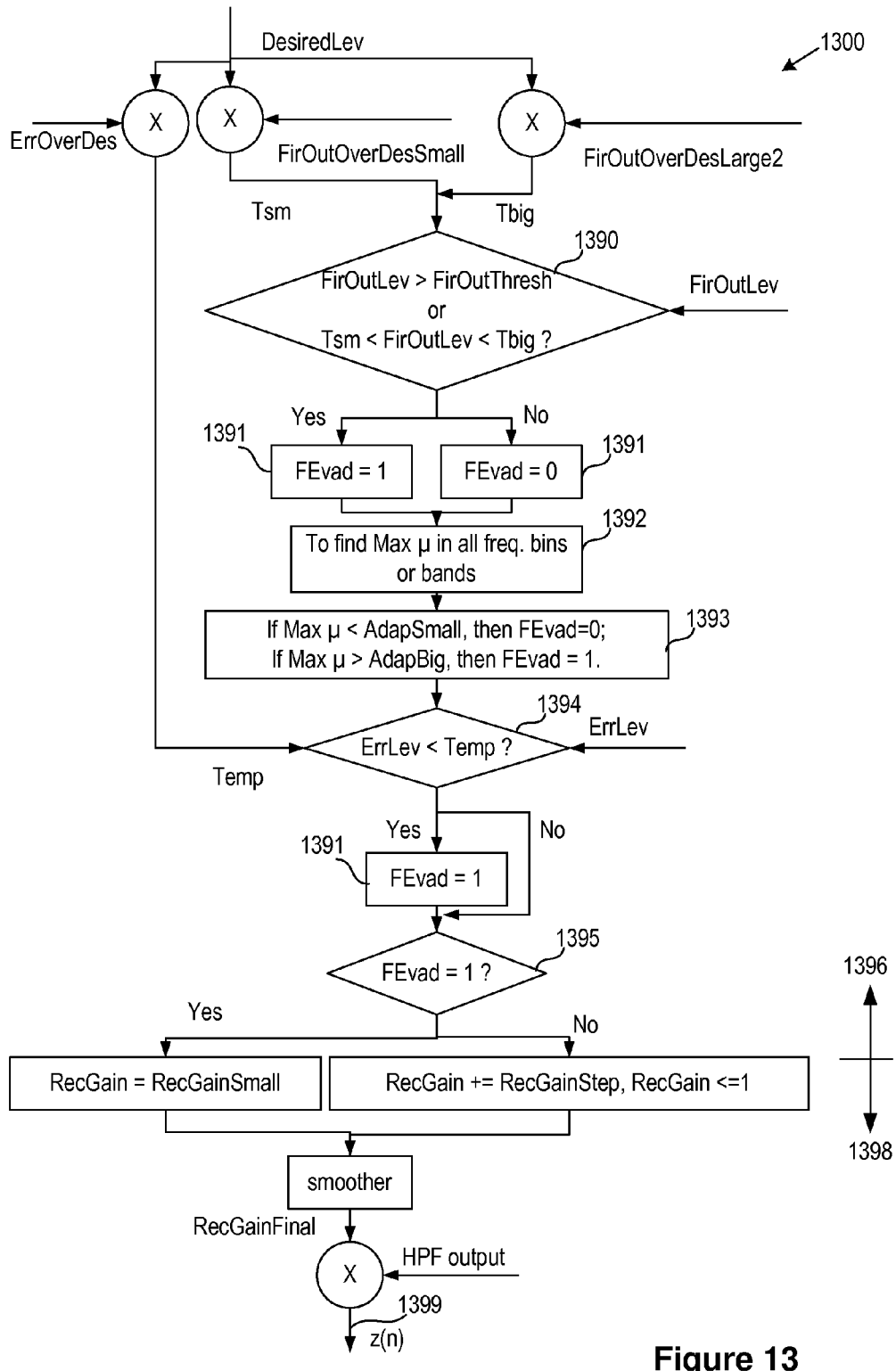
FIG. 13 is a flow diagram for time-domain residual echo suppression according to various embodiments of the present invention.

FIG. 13 is a flow diagram 1300 for time-domain residual echo suppression according to various embodiments of the present invention. For example, the process flow of TD REC 418, 518 in FIG. 4 or 5 is illustrated as shown in FIG. 13. The FirOutLev, ErrLev, and DesiredLev have been calculated in Section 2.2 as shown in FIG. 9. The constants in FIG. 13 are as follows: ErrOverDes=0.60, FirOutOverDesSmall=0.878, FirOutOverDesLarge2=1.20, FirOutThresh=0.01, AdapSmall=0.002, AdapBig=0.04, RecGainSmall=0.1, and RecGainStep=0.40. The Smoother is described by Eq. (4) with the factor $\alpha$=0.40.

In a preferred embodiment, a determination 1396 of far end voice activity detection (FEvad) is performed and then an application 1398 of suppressing the residual echo is performed based on the determination. The determination of FEvad is based on one or more factors: 1) a ratio/comparison 1390 between the microphone signal (e.g., DesiredLev) and estimated echo level (e.g, FirOutLev); 2) the adaptation step size $\mu$ in AEC Linear Processing (e.g., finding Max $\mu$ in all frequency bins or bands 1392; comparision between Max $\mu$ and predefined thresholds AdapSmall and AdapBig 1393); and 3) a ratio/comparison 1394 between the microphone signal (e.g., Desired Lev) and reduced echo level (e.g., ErrLev). Based on the factors, a state assignment will be given (e.g., FEvad=1; FEvad=0) as in process blocks 1391 and 1393. The state assignments will then be used to determine whether far end voice activity is detected and thereby whether residual echo is present. For example, if FEvad=1 in process block 1397, then residual echo is present.

Depending on whether far end voice activity is detected and thereby whether residual echo is present, an application 1398 of suppressing the residual echo is performed. Accordingly, a residual echo suppression output signal z(n) 1399 is generated (e.g., output of TD REC 418, 518). HPF output may correspond to the output of HPF 416, 516 or any other component (e.g., 412, 512) of system 400, 500. It should be appreciated by those skilled in the art that the constant values and processes noted are for exemplary purposes only and that other values and processes may be substituted for achieving residual echo suppression.

2.6 FD REC (Freq.-Domain Residual Echo Suppression)

The reference signal X(k), error signal E(k), adaptive filter weight W(k), and the coherence C(k) have been calculated in Section 2.1 as shown in FIG. 8. When the coherence C(k) gets high enough, there is no NE voice. In this case, the FD REC will further reduce the residual echo based on the ratio between the residual echo level |E(k)| and the level of the estimated echo |W(k)X(k)|.

The binary mask approach (either bin-by-bin scheme, or band-by-band scheme) is adopted for the reduction. The binary mask is calculated as follows, $$G(k) = \begin{cases} 1.0, & \text{if } |E(k)| > \gamma|W(k)X(k)| \\ G_{min}, & \text{Otherwise} \end{cases} \quad (5)$$

where $\gamma$ is a parameter that can be used to over-estimate the residual echo, and $G_{min}$ can be used to control the maximum attenuation, they are user adjustable.

3. Advantages of the Proposed EC System

In comparing with the prior-arts, some of the novelties and advantages of this proposed scheme can be summarized as follows:

(1) An adaptive nonlinear echo suppression is proposed so as to remove the nonlinear echo caused by the non-linearity in the system circuitry;

(2) A powerful nonlinear processing technique is proposed so as to get rid of the residual echo;

(3) The highpass filters (HPFs) are traditionally applied for both the microphone signals and the AEC reference signals to reduce the low frequency noises. In this invention, the HPFs are only applied for microphone signals so as to save MIPS and memory and also reduce the residual echo and noise of low frequencies; and (4) A simple echo leakage prevention scheme is designed.

The integration of one or more of the above system/process blocks has greatly reduced the residual echo so as to avoid the howling effect. With the proposed echo leakage prevention, the system output will not result in echo caused by the linear EC unit when the microphone is taken off or muted in the AEC system or when the electrical EC system has no electrical echo.

This proposed scheme can be adopted by both AEC and electrical echo cancellation. In terms of AEC, this invention supports one or more microphones and one or more reference channels. The numbers of microphones and reference channels are user configurable.

Figure 14:
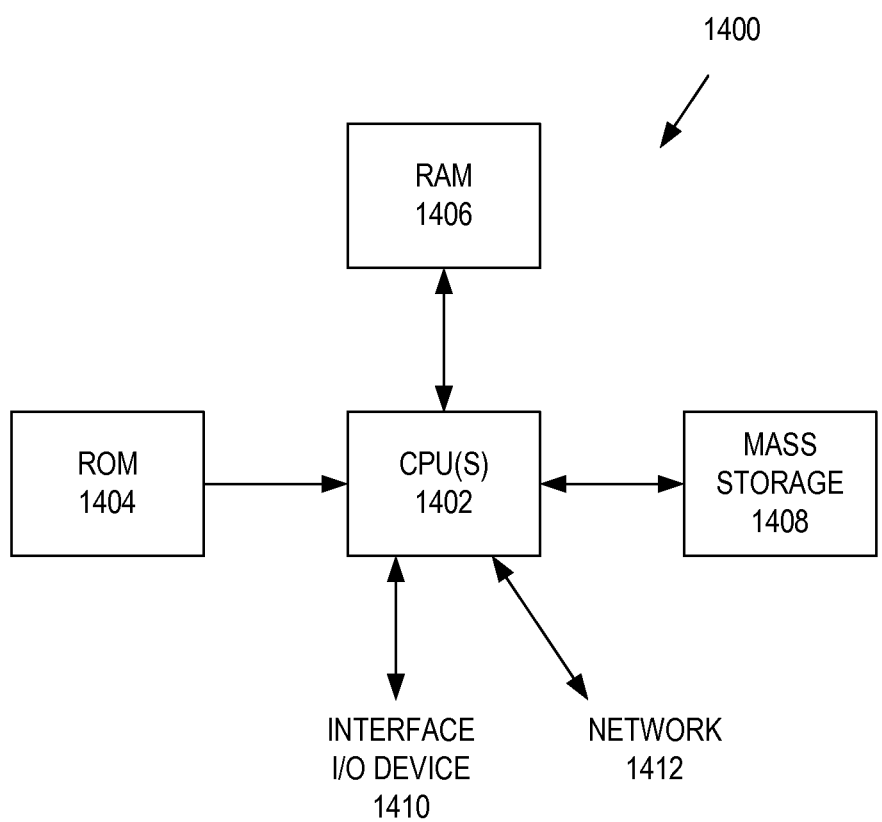
FIG. 14 illustrates a typical computer system that can be used in connection with one or more embodiments of the present invention.

This invention also relates to using a computer system according to one or more embodiments of the present invention. FIG. 14 illustrates a typical computer system that can be used in connection with one or more embodiments of the present invention. The computer system 1400 includes one or more processors 1402 (also referred to as central processing units, or CPUs) that are coupled to storage devices including primary storage 1406 (typically a random access memory, or RAM) and another primary storage 1404 (typically a read only memory, or ROM). As is well known in the art, primary storage 1404 acts to transfer data and instructions uni-directionally to the CPU and primary storage 1406 is used typically to transfer data and instructions in a bi-directional manner. Both of these primary storage devices may include any suitable computer-readable media, including a computer program product comprising a machine readable medium on which is provided program instructions according to one or more embodiments of the present invention.

A mass storage device 1408 also is coupled bi-directionally to CPU 1402 and provides additional data storage capacity and may include any of the computer-readable media, including a computer program product comprising a machine readable medium on which is provided program instructions according to one or more embodiments of the present invention. The mass storage device 1408 may be used to store programs, data and the like and is typically a secondary storage medium such as a hard disk that is slower than primary storage. It will be appreciated that the information retained within the mass storage device 1408, may, in appropriate cases, be incorporated in standard fashion as part of primary storage 1406 as virtual memory. A specific mass storage device such as a CD-ROM may also pass data uni-directionally to the CPU.

CPU 1402 also is coupled to an interface 1410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1402 optionally may be coupled to a computer or telecommunications network using a network connection as shown generally at 1412. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for processing signals, comprising:
an echo cancellation linear processing module configured for generating a first output signal by adaptively filtering an input signal, the first output signal being the input signal with any linear echo reduced;
a nonlinear echo processing module configured for generating a second output signal based on the first output signal, the second output signal being the first output signal with any residual linear echo or nonlinear echo reduced; and
an echo leakage prevention module configured for generating a third output signal based on the second output signal, the third output signal being the second output signal with echo leakage reduced.

2. The system as recited in claim 1, wherein the echo cancellation linear processing module comprises:
an echo cancellation operator for generating a residual echo signal by subtracting an estimated echo signal from the input signal; and
a first complex adaptive filter configured for generating a first estimated echo signal based on a first reference signal and the residual echo signal, wherein the estimated echo signal is the first estimated echo signal.

3. The system as recited in claim 2, wherein the echo cancellation linear processing module comprises:
a second complex adaptive filter configured for generating a second estimated echo signal based on a second reference signal and the residual echo signal, wherein the estimated echo signal is the first estimated echo signal plus the second estimated echo signal.

4. The system as recited in claim 2, wherein the complex adaptive filter uses filter weights that are updated automatically by coherence values based on the input signal and the first reference signal in real time.

5. The system as recited in claim 1, wherein the nonlinear echo processing module comprises:
a nonlinear echo determination module configured for determining whether nonlinear echo is present in the first output signal;
a nonlinear echo gain module configured for assigning a nonlinear echo gain for reducing nonlinear echo based on whether nonlinear echo is present in the first output signal; and
a nonlinear echo operator configured for applying the nonlinear echo gain to the first output signal in generating the second output signal.

6. The system as recited in claim 1, wherein the echo leakage prevention module comprises:
an echo leakage determination module configured for determining whether a RMS value of the input signal is below a minimum input threshold;
an echo leakage gain module configured for assigning an echo leakage gain for reducing echo leakage based on whether the RMS value of the input signal is below the minimum input threshold; and
an echo leakage operator configured for applying the echo leakage gain to the second output signal in generating the third output signal.

7. The system as recited in claim 6, further comprising:
a first residual echo suppression module configured for generating a fourth output signal based on the third output signal with any additional residual echo reduced.

8. The system as recited in claim 7, wherein the first residual echo suppression module comprises:

a residual echo determination module configured for determining whether residual echo is present;
a residual echo gain module configured for assigning a residual echo gain for reducing residual echo based on whether residual echo is present; and
a residual echo operator configured for applying the residual echo gain to the third output signal in generating the fourth output signal.

9. The system as recited in claim 7, further comprising:
a second residual echo suppression module configured for generating a fifth output signal based on the fourth output signal with any additional residual echo reduced, wherein the first residual echo suppression module is based in the time-domain and the second residual echo suppression module is based in the frequency-domain.

10. The system as recited in claim 1, further comprising:
a HPF configured for reducing low frequency residual echo or noise, the HPF being positioned inline with the input signal.

11. The system as recited in claim 1, wherein the input signal corresponds to a voice signal and the system is for processing signals to reduce acoustic echo.

12. The system as recited in claim 1, wherein the input signal corresponds to an electrical signal and the system is for processing signals to reduce electrical echo.

13. A method for an echo cancellation system to process signals:
generating a first output signal by adaptively filtering an input signal, the first output signal being the input signal with any linear echo reduced;
generating a second output signal based on the first output signal, the second output signal being the first output signal with any residual linear echo or nonlinear echo reduced; and
generating a third output signal based on the second output signal, the third output signal being the second output signal with echo leakage reduced.

14. The method as recited in claim 13, wherein generating the first output signal by adaptively filtering the input signal comprises:
generating a residual echo signal by subtracting an estimated echo signal from the input signal; and
generating a first estimated echo signal based on a first reference signal, the residual echo signal, and filter weights,
wherein the estimated echo signal is the first estimated echo signal, and
wherein the filter weights are updated automatically by coherence values based on the input signal and the first reference signal in real time.

15. The method as recited in claim 13, wherein generating the second output signal based on the first output signal comprises:
determining whether nonlinear echo is present in the first output signal;
assigning a nonlinear echo gain for reducing nonlinear echo based on whether nonlinear echo is present in the first output signal; and
applying the nonlinear echo gain to the first output signal in generating the second output signal.

16. The method as recited in claim 13, wherein generating the third output signal based on the second output signal comprises:
determining whether a RMS value of the input signal is below a minimum input threshold;
assigning an echo leakage gain for reducing echo leakage based on whether the RMS value of the input signal is below the minimum input threshold; and
applying the echo leakage gain to the second output signal in generating the third output signal.

17. The method as recited in claim 16, further comprising:
generating a fourth output signal based on the third output signal with any additional residual echo reduced.

18. The method as recited in claim 17, wherein generating the fourth output signal based on the third output signal with any additional residual echo reduced comprises:
determining whether residual echo is present;
assigning a residual echo gain for reducing residual echo based on whether residual echo is present; and
applying the residual echo gain to the third output signal in generating the fourth output signal.

19. The method as recited in claim 17, further comprising:
generating a fifth output signal based on the fourth output signal with any additional residual echo reduced, wherein the first residual echo suppression module is based in the time-domain and the second residual echo suppression module is based in the frequency-domain.

20. A computer program product for processing signals to reduce either acoustic or electrical echo, the computer program product being embodied in a non-transitory computer readable medium and comprising computer executable instructions for:
generating a first output signal by adaptively filtering an input signal, the first output signal being the input signal with any linear echo reduced;
generating a second output signal based on the first output signal, the second output signal being the first output signal with any residual linear echo or nonlinear echo reduced; and
generating a third output signal based on the second output signal, the third output signal being the second output signal with echo leakage reduced.

* * * * *